United States Patent [19]
Jang

[11] Patent Number: 5,565,000
[45] Date of Patent: Oct. 15, 1996

[54] HYDRAULIC CONTROL SYSTEM OF AUTOMATIC TRANSMISSION FOR AUTOMOTIVE VEHICLE

[75] Inventor: Jaeduk Jang, Yongin-kun, Rep. of Korea

[73] Assignee: Hyundai Motor Company, Seoul, Rep. of Korea

[21] Appl. No.: 571,177

[22] Filed: Dec. 12, 1995

Related U.S. Application Data

[62] Division of Ser. No. 381,914, Feb. 13, 1995.

[30] Foreign Application Priority Data

Jun. 22, 1993 [KR] Rep. of Korea ............... 93-11423
Jul. 1, 1993 [KR] Rep. of Korea ............... 93-12307

[51] Int. Cl.$^6$ .............................................. F16H 61/26
[52] U.S. Cl. ........................ 477/130; 477/132; 477/143
[58] Field of Search ............................ 477/125, 130, 477/143, 149, 155, 132

[56] References Cited

U.S. PATENT DOCUMENTS

| | | | |
|---|---|---|---|
| 4,942,782 | 7/1990 | Kuwayama et al. | |
| 5,010,788 | 4/1991 | Sugano et al. | 477/143 X |
| 5,012,700 | 5/1991 | Takada et al. | 477/144 |
| 5,074,168 | 12/1991 | Ishikawa et al. | |
| 5,079,973 | 1/1992 | Ookubo et al. | |
| 5,086,672 | 2/1992 | Kato et al. | 477/126 X |

FOREIGN PATENT DOCUMENTS

| | | |
|---|---|---|
| 0329307 | 8/1989 | European Pat. Off. |
| 0354005 | 2/1990 | European Pat. Off. |
| 94/15809 | 7/1994 | WIPO |

*Primary Examiner*—Khoi Q. Ta

[57] ABSTRACT

A hydraulic control system of an automatic transmission for an automotive vehicle includes a hydraulic pump, a pressure regulating valve, a torque converter, a converter clutch, first, second and third solenoid valves, first through eighth friction elements, second and third speed clutch valves, a band valve and a manual value. The pressure regulating valve varies a hydraulic pressure when shifting, and the converter clutch regulator valve actuates a damper clutch to improve transmission efficiency of the torque converter. The first, second and third solenoid valves supply or obstruct the supply of hydraulic pressure from the pressure regulating valve to a respective one of a first, second and third clutch shift valve to displace valve spools of a respective one of the first, second and third clutch shift valves. The second speed and third speed clutch shift valves as well as the fourth speed band valve, selectively supply hydraulic pressure to the friction elements to perform shifting. The second speed and third speed clutch shift valves as well as the fourth speed band valve are controlled by the solenoid valve and an overdrive unit valve.

6 Claims, 8 Drawing Sheets

| GEAR | S1 | S2 | S3 | S5 | S4 | REMARKS |
|---|---|---|---|---|---|---|
| N→D | ON | ON | OFF | DUTY CONTROL | — | |
| N→R | — | — | — | ↑ | ON→OFF | |
| 1 | ON | ON | OFF | VARIABLE | OFF | |
| 1→2 | DUTY CONTROL (ON→OFF) | ON | OFF | OFF | OFF | |
| 2 | OFF | ON | OFF | VARIABLE | OFF | |
| 2→3 | OFF | DUTY CONTROL (ON→OFF) | OFF | OFF | OFF | |
| 3 | OFF | OFF | OFF | VARIABLE | OFF | EMERGENCY MODE |
| 3→4 | OFF | OFF | DUTY CONTROL (ON→OFF) | OFF | OFF | |
| 4 | OFF | OFF | ON | VARIABLE | OFF | |
| 3→1 | DUTY CONTROL (OFF→ON) | DUTY CONTROL (OFF→ON) | OFF | OFF | OFF | SKIP SHIFT |
| 4→2 | OFF | DUTY CONTROL (OFF→ON) | DUTY CONTROL (OFF→ON) | OFF | OFF | SKIP SHIFT |
| REVERSE INHIBITION | — | — | — | — | ON | |

| STAGE | SOLENOID VALVE | S1 | S2 | S3 | S7 |
|---|---|---|---|---|---|
| D | 1st | ON | ON | OFF | OFF |
|   | 2nd | OFF | ON | OFF | OFF |
|   | 3rd | OFF | OFF | OFF | OFF |
|   | 4th | OFF | OFF | ON | OFF |
|   | 5th | OFF | OFF | ON | ON |

HYDRAULIC CONTROL SYSTEM OF AUTOMATIC TRANSMISSION FOR AUTOMOTIVE VEHICLE

This application is a divisional of copending application Ser. No. 08/381,914, filed on Feb. 3, 1995, the entire contents of which are hereby incorporated by reference.

BACKGROUND OF THE INVENTION

1. Field of the Invention

This invention relates to a hydraulic control system of an automatic transmission for automotive vehicle, particularly to a hydraulic control system of automatic transmission wherein line pressure is controlled variably to improve the power train efficiency and the response of shifting time during gear shifting.

2. Description of the Conventional Art

A conventional vehicle automatic transmission has a torque converter and a multiple stage transmission gear mechanism connected with the torque converter, which includes hydraulically actuated friction members for selecting one of the gear stages of the transmission gear mechanism in accordance with vehicle operating conditions.

The hydraulic control system pressurized by a hydraulic pump provides the hydraulic pressure required to operate the friction members and control valves.

A commonly used automatic transmission of a vehicle has a hydraulic torque converter which generally includes a pump impeller connected with an engine output shaft to be driven thereby, a turbine runner with an output shaft member, and a stator disposed between the pump impeller and the turbine runner, so that the fluid is circulated by the engine driven pump impeller through the turbine runner with the aid of the stator which functions to deflect the fluid from the turbine runner to a direction where the fluid flow does not disturb the rotation of the pump impeller when the fluid flows into the pump impeller.

The automatic shift is made by operating the friction members such as clutches or a kick down brake at each shift change. Also, a manual valve of which ports are converted by selecting a position of a selector lever, is designed to be supplied with fluid from a hydraulic pump and to supply the fluid to a shift control valve. In case of a 4-speed automatic transmission, the shift control valve has an operated port made by an electronic control system.

An example of a hydraulic pressure control system of an automatic transmission for a vehicle will be described with reference to FIG. 8 which shows a conventional hydraulic control system comprising a torque converter 1 attached to the engine through the engine flexible plate, and rotating at engine speed for transmitting power of the engine to an input shaft of the transmission gear mechanism, a damper clutch control valve 2 for controlling the application and release of a damper clutch to increase the power train efficiency inside the torque converter 1, a regulator valve 5 for regulating the output hydraulic pressure of the hydraulic pump 4 according to the automatic transmission requirements, and a reducing valve 6 for stably regulating the supply of the hydraulic pressure to a solenoid valve and the damper clutch control valve 2.

A manual valve 7, which is connected to an outlet of the hydraulic pump 4 and is provided with the hydraulic pressure, is designed to deliver the line pressure to the regulator valve 5 and a shift control valve. In the manual valve 7, lands are changed according to the position of a shift selector lever.

A shift control valve 8, which is operated in response to two shift control solenoid valves A and B controlled by a TCU (Transmission Control Unit), is designed to transmit the hydraulic pressure selectively through a first-second speed shift valve 9, an end clutch valve 10, a second-third and third-fourth speed shift valve 11, and a rear clutch exhaust valve 12 to a front clutch 13, a rear clutch 14, a low-reverse brake 15, a kick down servo brake 16, an end clutch 17, and the like. An N-D control valve 18 is connected to the rear clutch 14. An N-R control valve 19 is connected to the first-second speed shift valve so as to reduce the impact caused by the shift.

Also, a pressure control solenoid valve 20 is connected to a pressure control valve 21 to reduce the shock produced by the control at the time of shifting.

According to the location of a valve spool within the shift control valve 8, which is controlled by the shift control solenoid valves A and B, the fluid pressurized in the hydraulic pump 4 is supplied through a first conduit D1, a second conduit D2, a third conduit D3, and a fourth conduit D4. When the shift select lever of the manual valve 7 is at an "R" range, the pressurized fluid is supplied through a reverse conduit R1. Following is the description of shifting operation in the system of FIG. 8.

When the shift select lever is at a "D" range, the fluid pressurized in the hydraulic pump 4 is supplied through a conduit L1 into the manual valve 7, which is further supplied through a conduit L2 into the shift control valve 8 and the first conduit D1.

At a first speed of the "D" range, both of the shift control solenoid valves A and B are controlled to an ON state by the TCU, and therefore the hydraulic pressure passing through the shift control valve 8 is exhausted to effect no change in the location of the valve spool. At the same moment, the TCU controls the pressure control solenoid valve 20 to an ON state, and a part of the pressurized fluid returning through the reducing valve 6 is exhausted.

However, because the hydraulic pressure is not supplied into the first-second speed shift valve 9, the hydraulic pressure passing through the conduit D1 is supplied via the rear clutch exhaust valve 12 into the rear clutch 14 to actuate the same.

Figure 8:
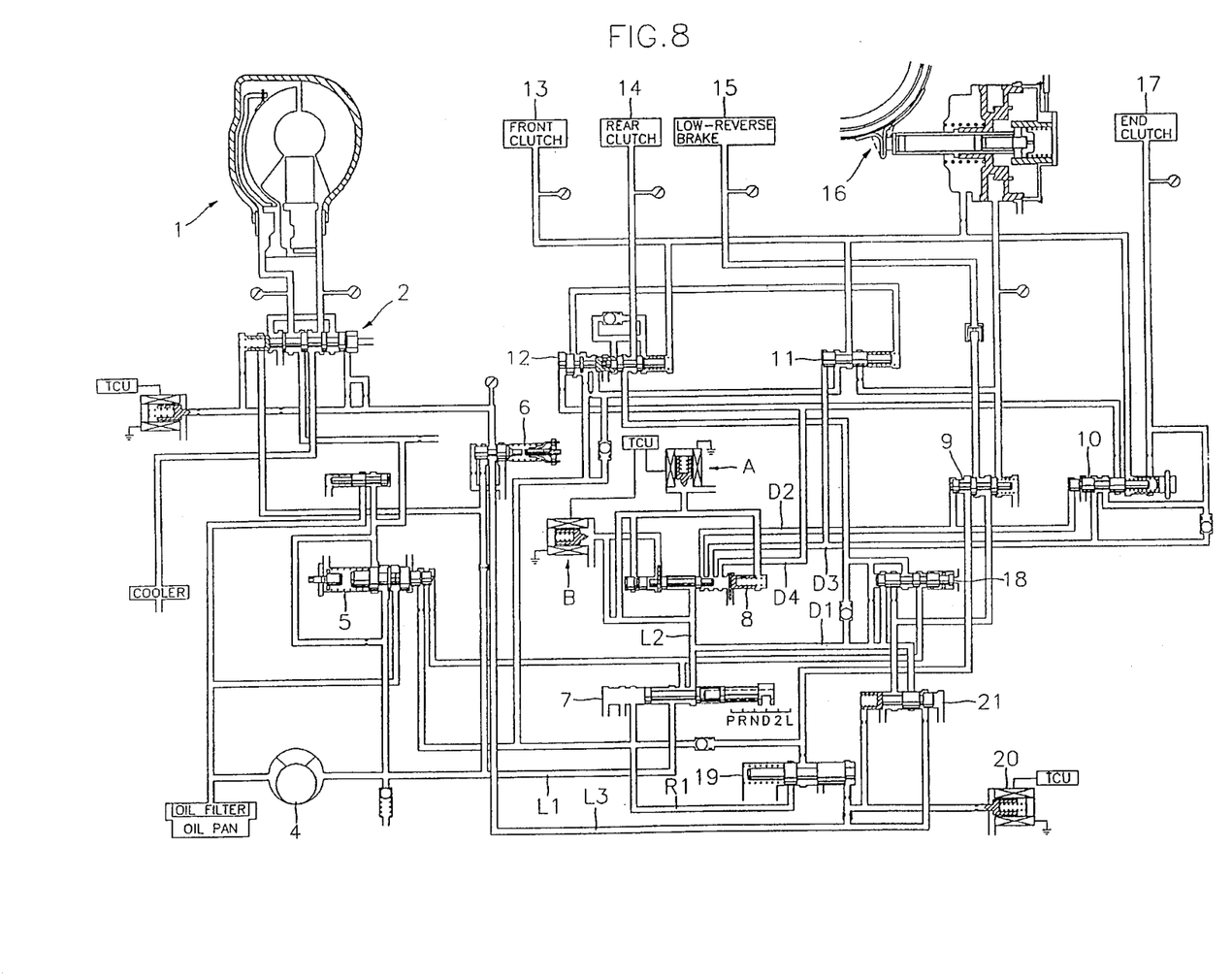
FIG. 8 is a schematic view of a hydraulic control system of the prior art.

At a second speed of the "D" range, the shift control solenoid valves A is controlled to an OFF state by the TCU, and the hydraulic pressure is exhausted toward the shift control solenoid valve B to displace the valve spool and a plug of the shift control valve 8 rightward in FIG. 8 so that the hydraulic pressure flowing into the manual valve 7 is supplied through the conduit D2.

Accordingly, the hydraulic pressure passing through the conduit D2 is supplied to the left side of the first-second speed shift valve 9 to push the valve spool rightward in order to provide for a third speed. At this moment, the pressure control solenoid valve 20 is controlled to an OFF state to keep the hydraulic pressure from being exhausted, and thus the fluid pressurized in the hydraulic pump 4 is supplied to the left side of the pressure control valve 21 via the reducing valve 6 and a hydraulic conduit L3 to push the valve plug therein rightward. Accordingly, the hydraulic pressure passing the first conduit D1 returns to the first-second speed shift valve 9 via the N-D control valve 18.

Because the valve spool of the first-second speed shift valve 9 is pushed rightward, the hydraulic pressure which has passed the N-D control valve 18 is supplied to the kick down servo brake 16 to actuate the same, and the second speed is accomplished thereby.

At a third speed of the "D" range, because both of the shift control solenoid valves A and B are controlled to the OFF state by the TCU, the hydraulic pressure is kept from being exhausted, the valve spool of the shift control valve 8 is moved rightward farther, and the valve plug remains stopped by means of a stopper.

At this state, because the second and third conduits D2 and D3 are opened simultaneously, the hydraulic pressure passing through the second conduit D3 and coming into the right side of the end clutch valve 10 pushes the valve plug leftward and gets into the end clutch 17 to actuate the same.

The pressurized fluid is controlled by passing through the first-second speed shift valve 9 via the pressure control valve 21 and is passed through the second-third and fourth-third speed shift valve 11. Then, a part of the pressurized fluid acts to release the kick down servo brake 16 and another part of the pressurized fluid acts to actuate the front clutch 13.

At this moment, the servo brake 16 which was actuated at the second speed is deactivated by the action of the hydraulic pressure supplied through the conduit connected to the front clutch 13.

At a fourth speed of the "D" range, because only the shift control solenoid valve B is controlled to the OFF state by the TCU, the valve spool of the shift control valve 8 is moved rightward farther than it is at the third speed to open the fourth conduit D4.

Then the hydraulic pressure is supplied to the left side of the rear clutch exhaust valve 12 to push the valve spool therein rightward to stop supplying the hydraulic pressure for actuating the front clutch 13 and the hydraulic pressure for deactivating the kick down servo brake 16. Accordingly, the kick down servo brake 16 is actuated again automatically, the end clutch 17 which has been actuated at the third speed is actuated also, and the fourth speed is accomplished thereby.

When the shift select lever is at the "R" range, the hydraulic pressure passing through the manual valve 7 is supplied to the right side of the second-third speed and fourth-third speed shift valve 11 via the rear clutch exhaust valve 12 to push the valve spool leftward, and thus the hydraulic pressure passing through the manual valve 7 is supplied to the front clutch 13 and the low-reverse brake 15 and acts to deactivate the kick down servo brake 16 to drive the vehicle in the reverse direction.

As described hitherto, the fluid supply efficiency of the above-mentioned automatic transmission control system is bad because the shifting is performed simply between the first speed and the fourth speed and the hydraulic pressure from the hydraulic pump are supplied in two modes only. Also it is difficult to improve the pump efficiency and the shifting effect because the shock in the N-D control valve is controlled by the duty-control of the pressure control valve when N-D shifting. Furthermore, it is not possible to make a skip shifting, which results in a slow response, because the individual clutches are not controlled independently, and it has a complicated construction because the shift valves are controlled indirectly.

SUMMARY OF THE INVENTION

An object of the present invention is to provide an automatic transmission system of a vehicle with an improved shifting responsiveness by controlling clutches with torque control hydraulic pressure until a shifting is completed, and thereafter, by controlling with drive hydraulic pressure by means of shift valves.

Another object of the present invention is to provide an automatic transmission system of a vehicle wherein line pressure can be controlled variably in order to enhance the power train efficiency during driving and enhance shift feeling when shifting a manual valve.

Still another object of the present invention is to provide an automatic transmission for a vehicle which can provide a skip shifting when the vehicle should speed up swiftly during driving, in order to enhance the shifting responsiveness.

In order to accomplish the object, the present invention provides a hydraulic control system of an automatic transmission for an automotive vehicle, comprising: a hydraulic pump driven by an engine for pressurizing fluid; a pressure regulating valve for varying a hydraulic pressure when shifting to a forward mode or a reverse mode; a torque converter for transmitting a power of the engine to an input shaft of the transmission; a converter clutch regulator valve for actuating a damper clutch to improve a transmission efficiency of the torque converter; first, second and third solenoid valves controlled by means of a TCU (Transmission Control Unit) for supplying the hydraulic pressure or obstructing a supply of the hydraulic pressure which is varied in the pressure regulating valve to shift valves of a transmission control section to displace valve spools of the shift valves; first friction elements commonly actuated at each speed stage; first, second, fourth and fifth friction elements, at least one of which is actuated according to the speed stages; reverse friction elements actuated at the reverse mode; second speed and third speed clutch valves and a fourth speed band valve controlled by ON/OFF functions and duty control functions of the solenoid valves for selectively supplying the hydraulic pressure to the friction elements to perform shifting; a reverse clutch inhibiter valve for obstructing a supply of the hydraulic pressure to a sixth friction element to keep the vehicle from malfunctioning when the reverse mode is selected in error while driving forward; and a manual valve operated by a shift select lever for supplying line pressure to a reverse pressure conduit or to a forward pressure conduit.

Also, the present invention provides the hydraulic control system wherein the first and second solenoid valves are of normally open types and the third solenoid valve is of a normally closed type.

Also, the present invention provides the hydraulic control system wherein the second speed clutch valve comprises: a first port to which the hydraulic pressure from the forward pressure conduit is supplied; a second port for supplying the hydraulic pressure supplied to the first port to the second friction element; third and fourth ports for supplying the hydraulic pressure from the forward pressure conduit to the third speed clutch valve; fifth and sixth ports for supplying the hydraulic pressure to the fourth friction element at a second speed of a "D" range; a seventh port for supplying the hydraulic pressure to the sixth friction element at a first speed of the "D" range or at an "L" range; and a valve spool for selectively opening the ports comprising a first land for opening and closing the first and second ports, a second land for opening and closing the third and fourth ports and a third land for making the fifth port communicated with the sixth port or the seventh port.

Also, the present invention provides the hydraulic control system wherein the third speed clutch valve comprises: a first port to which the hydraulic pressure is supplied according to an ON/OFF function of the second solenoid valve; a second port for supplying the hydraulic pressure supplied to the first port to the first friction element; a third port directly communicating with the fourth port of the second speed clutch valve; a fourth port for supplying the hydraulic pressure to the fourth speed band valve; and a valve spool for selectively opening the ports comprising a first land for selectively opening the first and second ports and a second land for opening and closing the third and fourth ports.

Also, the present invention provides the hydraulic control system wherein the fourth speed band valve comprises: a first port to which the hydraulic pressure is supplied according to an ON/OFF function of the third solenoid valve; a second port for supplying the hydraulic pressure supplied to the first port to the fourth friction element; a third port directly communicating with the second port of the third speed clutch valve; a fourth port for supplying the hydraulic pressure supplied to the third port to the fifth friction element to perform the engine brake at a third speed of the "D" range; and a valve spool for selectively opening the ports comprising a first land for opening and closing the first and second ports and a second land for opening and closing the third and fourth ports.

Also, the present invention provides the hydraulic control system wherein the first and second solenoid valves controlled from an OFF state to an ON state in accordance with a duty ratio at a third-first skip shifting to release an operating hydraulic pressure to the second and third friction elements simultaneously.

Also, the present invention provides the hydraulic control system wherein the second and third solenoid valves are controlled from an OFF state to an ON state in accordance with a duty ratio at a fourth-second skip shifting to release an operating hydraulic pressure to the fourth friction element simultaneously.

DETAILED DESCRIPTION OF THE INVENTION

Following are the description with reference to the figures wherein same numbering systems are used to represent the same component parts.

FIG. 1 to 4 illustrate a first embodiment of the invention applied to a 4-speed automatic transmission.

Figure 1:
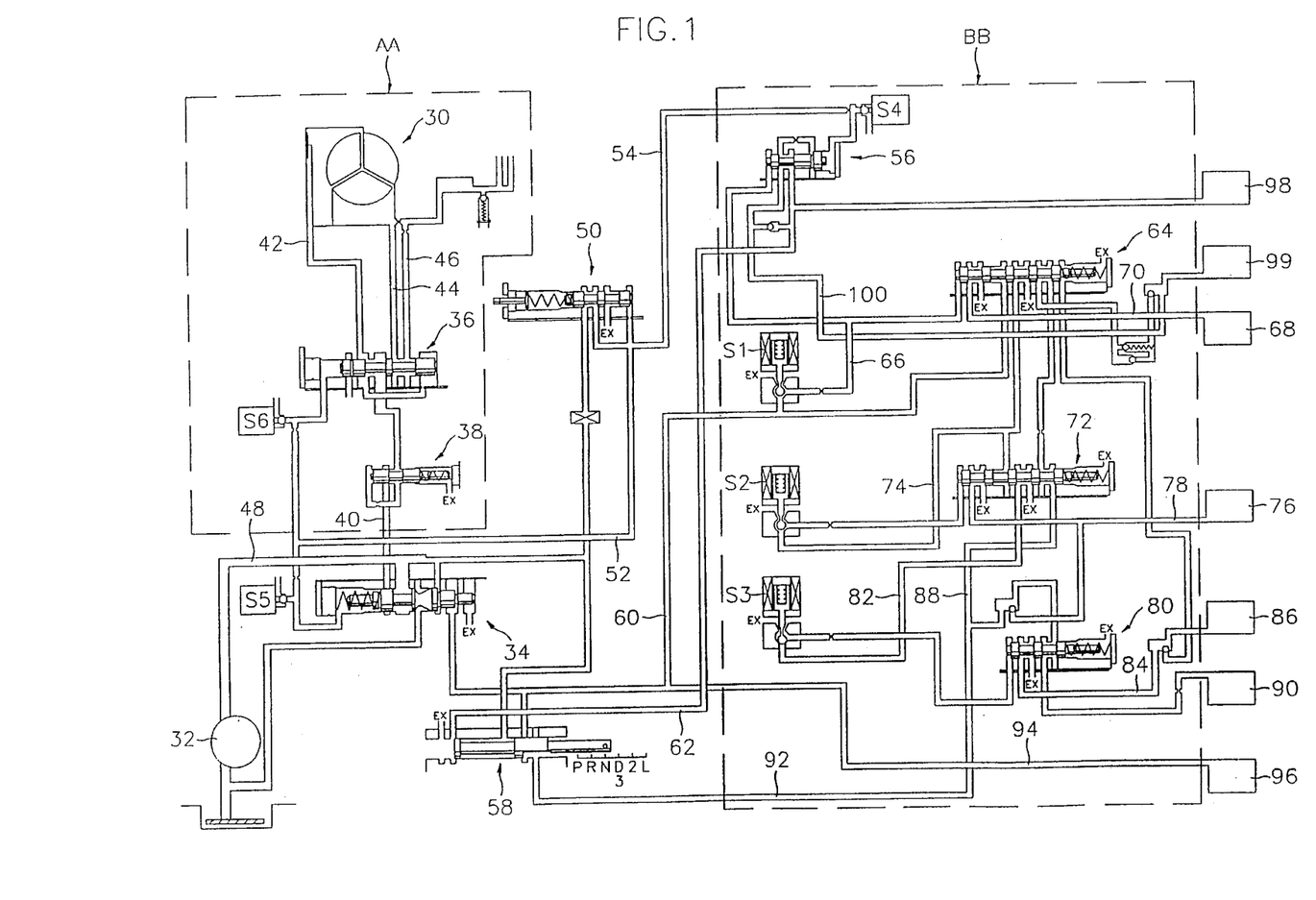
FIG. 1 is a schematic view of a hydraulic control system of a 4-speed automatic transmission according to a first embodiment of the invention.

FIG. 1 shows a hydraulic control system, when the shift select lever is in an "R" range, according to a first embodiment of the invention.

A power transmission efficiency control section AA has a torque converter 30 located between a crank shaft and a transmission for transmitting the engine power, a hydraulic pump 32 having a drive gear fixed to a pump drive hub of the torque converter for rotation therewith and a driven gear engaged with the drive gear, a pressure regulating valve 34 for regulating the hydraulic pressure developed in the hydraulic pump 32 to actuate or deactivate a damper clutch of the torque converter 30, a converter clutch regulator valve 36 located between the pressure regulating valve 34 and the torque converter 30 for selecting the actuation or deactivation of the damper clutch, and a converter feed valve 38 for regulating the hydraulic pressure supplied to the torque converter 30.

The hydraulic pressure from the pressure regulating valve 34 is supplied to the torque converter 30 via a conduit 40. Via the converter clutch regulator valve 36, the conduit 40 is divided into a supply conduit 42, an exhaust conduit 44 and a lubrication conduit 46.

The displacement of the valve spool within the converter clutch regulator valve 36 is controlled by a solenoid valve S6 which in turn is controlled by the TCU (not shown) to selectively supply the hydraulic pressure toward the supply conduit 42 or the exhaust conduit 44.

A line pressure conduit 48 connects the hydraulic pump 32 and the pressure regulating valve 34 and is further extended to communicate with a solenoid supply valve 50.

The solenoid supply valve 50 is connected to solenoid valves S5 and S6 via a first control conduit 52 and to a solenoid valve S4 via a second control conduit 54 such that the pressure regulating valve 34, the converter clutch regulator valve 36 and a reverse clutch inhibiter valve 56 can be controlled in accordance with duty ratios by these solenoid valves.

The line pressure conduit 48 not only supply the hydraulic pressure to the solenoid supply valve 50 but also makes connection for supplying the hydraulic pressure to a manual valve 58. The hydraulic pressure supplied to the manual valve 58 is selectively passed to a forward pressure conduit 60 or a reverse pressure conduit 62 according to the displacement of the valve spool thereof.

The hydraulic pressure in the forward pressure conduit 60 is supplied to a second speed clutch valve 64 of a transmission control section BB via a conduit 66. The supply of the hydraulic pressure into this conduit 66 can be shut off by means a solenoid valve S1 which is controlled by the TCU.

A conduit 70 is connected to the second speed clutch valve 64 in order to supply the hydraulic pressure passed through the conduit 66 to a second friction element 68.

The forward pressure conduit 60 is not only for supplying the hydraulic pressure to the second friction element 68 but also for supplying the hydraulic pressure to a third speed clutch valve 72 via a conduit 74. A solenoid valve S2 controlled by the TCU is arranged in the conduit 74 and shuts off the hydraulic pressure supplied through the conduit 74.

The third speed clutch valve 72 which receives the hydraulic pressure through the conduit 74 is connected to a conduit 78 for supplying the hydraulic pressure to a third friction, element 76. The conduit 74 is connected to a conduit 82 via the third speed clutch valve 72 for supplying the hydraulic pressure to a fourth speed band valve 80.

A solenoid valve S3 controlled by the TCU is arranged in the conduit 82 and shuts off the hydraulic pressure passing through the conduit 82. The hydraulic pressure from the fourth speed band valve 80 is supplied to a fourth friction element 86 via a conduit 84.

The third speed clutch valve 72 and the fourth speed band valve 80 are directly connected to each other through a conduit 88. The conduit 88 is for supplying the hydraulic pressure to a fifth friction element 90 which performs an engine brake at the third speed of the "D" range and is connected to a conduit 92 for supplying the hydraulic pressure from the manual valve 58 at a "2" range or an "L" range.

The hydraulic pressure from the manual valve 58 is supplied to a first friction element 96 via the forward pressure conduit 60 and a conduit 94. The hydraulic pressure passing through the conduit 94 exerts power to a spool of the pressure regulating valve 34.

Through the reverse pressure conduit 62 connected to the manual valve 58, the hydraulic pressure is directly supplied to a reverse friction element 98. According to the displacement of a spool of the reverse clutch inhibiter valve 56 which is controlled by the solenoid valve S4, the hydraulic pressure from the reverse pressure conduit 62 can be supplied to a sixth friction element 99 via the conduit 100.

Figure 2:
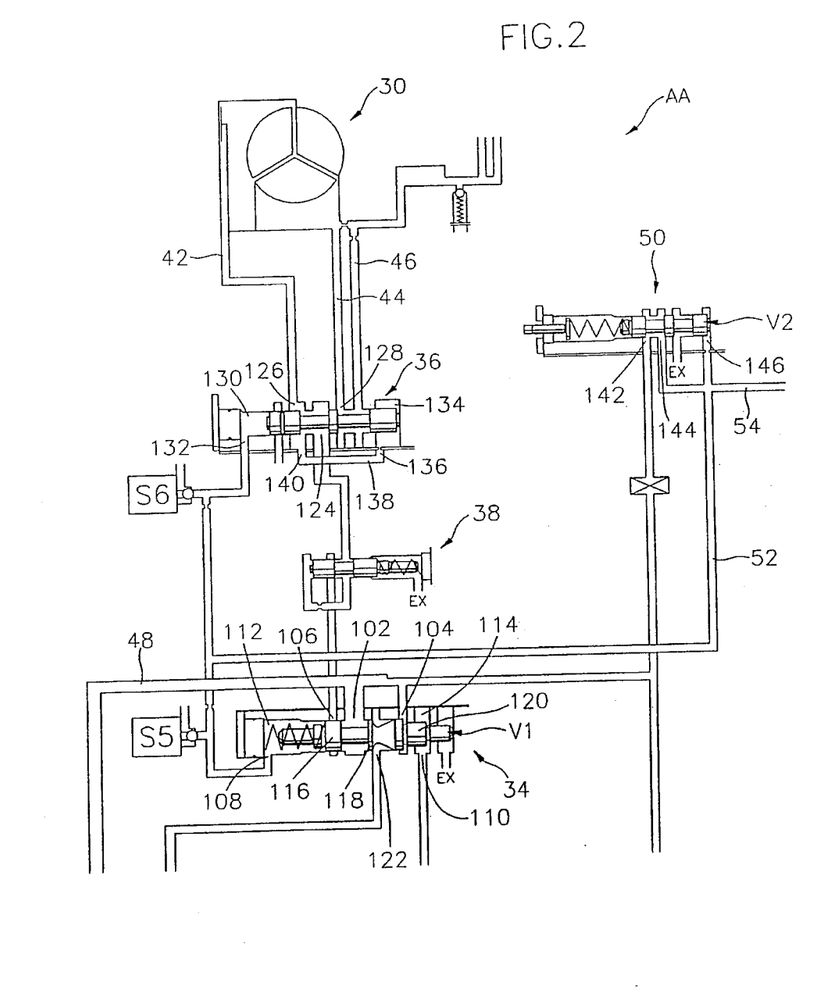
FIG. 2 is an enlarged view of a power transmission efficiency control section in the system shown in FIG. 1.

FIG. 2 is an enlarged view of a power transmission efficiency control section in the system shown in FIG. 1. The pressure regulating valve 34 has a first port 102 and a second port 104 to which the hydraulic pressure from the conduit 48 is supplied, a third port 106 for supplying the hydraulic pressure to the converter feed valve 38, a fourth port 108 to which the hydraulic pressure from the solenoid supply valve 50 is supplied via the first control conduit 52, and a fifth port 110 which supplies the hydraulic pressure to exert a force to a valve spool V1 of the pressure regulating valve 34 when the hydraulic pressure supplied through the fourth port 108 is exhausted.

The fourth port 108 and the fifth port 110 communicate with a first pressure detecting chamber 112 and a second pressure detecting chamber 114 respectively. The hydraulic pressure supplied through these ports 108 and 110 exert forces to the valve spool V1 in directions opposite from each other.

The valve spool V1 has a first land 116, a second land 118 and a third land 120 for selectively opening the ports. The first land 116 open and close the third port 106 and the second land 118 open and close an exhaust port 122 which is connected back to the hydraulic pump 32.

The converter clutch regulator valve 36 has a first port 124 to which the .hydraulic pressure from the converter feed valve 38 is supplied, a second port 126 and a third port 128 for supplying or exhausting the hydraulic pressure to the torque converter valve 30, a fourth port 132 for supplying the hydraulic pressure to a first pressure detecting chamber 130, and a fifth port 136 for supplying the hydraulic pressure to a second pressure detecting chamber 134. The fifth port 136 can be supplied with the hydraulic pressure from a sixth port 140 which is connected to a bypass conduit 138.

The solenoid supply valve 50 has a first port 142 to which the hydraulic pressure is supplied from the line pressure conduit 48, a second port 144 through which the hydraulic pressure supplied through the first port 142 is exhausted, and a third port 146 through which the hydraulic pressure passed through the second port 144 exerts a force to a valve spool V2.

Figure 3:
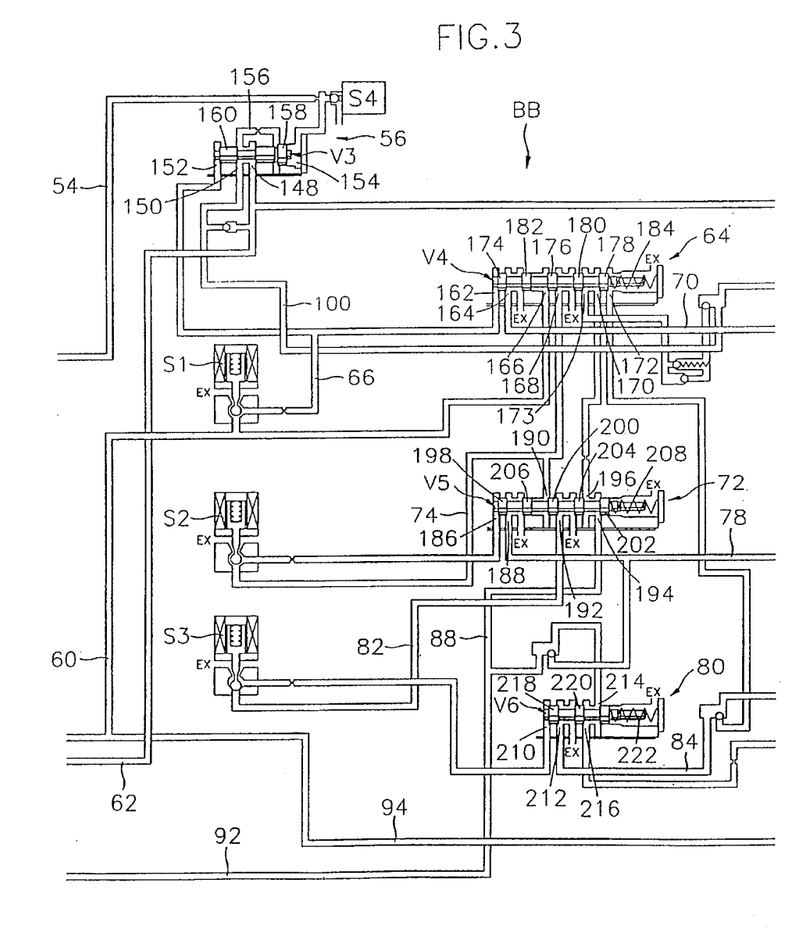
FIG. 3 is an enlarged view of a shift control section in the system shown in FIG. 1.

FIG. 3 is an enlarged view of a shift control section in the system shown in FIG. 1. As shown in FIGS. 1 and 3, the reverse clutch inhibiter valve 56 which keeps the vehicle from malfunctioning when the reverse mode is selected in error while driving forward has a first port 148 to which the hydraulic pressure from the reverse pressure conduit 62 is supplied, a second port 150 for supplying the hydraulic pressure from the first port 148 to the sixth friction element 99 so that the sixth friction element 99 can be actuated together with the reverse friction element 98 when driving rearward, and a third port 152 to which the hydraulic pressure from the forward pressure conduit 60 is supplied through the conduit 66.

A bypass conduit 156 is connected to the reverse clutch inhibiter valve 56. Through this bypass conduit 156, the hydraulic pressure supplied through the first port 148 is supplied a the pressure detecting chamber 154 which is pressurized or depressurized by the solenoid valve S4.

A valve spool V3 which is shifted leftward under the action of the hydraulic pressure from the pressure detecting chamber 154 has a first land 158, the largest, and a second land 160 for separating the first port 148 from the second port 150.

The second speed clutch valve 64 has a first port 162 to which the hydraulic pressure is supplied through the conduit 66, a second port 164 for supplying the hydraulic pressure from the first port 162 to the second friction element 68, a third port 166 to which the hydraulic pressure from the forward pressure conduit 60 is directly supplied, and a fourth port 168 for supplying the hydraulic pressure from the third port 166 to the third speed clutch valve 72.

The second speed clutch valve 64 further has a fifth port 170 to which the hydraulic pressure from the manual valve 58, which is passed through the conduit 92 and 88 and is passed through the third speed clutch valve 72 at the fourth speed of the "D" range or at the second speed of a "2" range, is supplied, and a sixth port 172 and a seventh port 173 for supplying the hydraulic pressure supplied to the fifth port 170 to the fourth friction element 86 and the sixth friction element 99 respectively.

A valve spool V4 of the second speed clutch valve 64 has a first land 174 for selectively separating the first port 162 from the second port 164, a second land 176 for selectively separating the third port 166 from the fourth port 168, a third land 178 and a fourth land 180 for selectively supplying the hydraulic pressure from the fifth port 150 to the sixth port 172 or to the seventh port 173, and a fifth land 182 arranged between the first land 174 and the second land 176 for obstructing the hydraulic pressure from being exhausted through an exhaust port Ex. This valve spool V4 is biased by means of an elastic member 184 such that the first port 162 and the second port 164 are obstructed when the hydraulic pressure is exerting no force on the valve spool V4.

The third speed clutch valve 72 has a first port 186 which receives the hydraulic pressure via the conduit 74, a second port 188 for supplying the hydraulic pressure from the first port 186 to the third friction element 76, a third port 190 which receives the hydraulic pressure from the conduit 74 via another conduit, a fourth port 192 for supplying the hydraulic pressure from the third port 190 to the fourth speed band valve 80, a fifth valve 194 which receives the hydraulic pressure via the conduit 88, and a sixth port 196 for supplying the hydraulic pressure supplied to the fifth port 170 to the fifth port of the second speed clutch valve 64.

A valve spool V5 of the third speed clutch valve 72 has a first land 198 for opening and closing the first port 186 and the second port 188, a second land 200 for selectively separating the third port 190 from the fourth port 192, a third land 202 for selectively separating the sixth port 196 from the fifth port 194, and a fourth land 204 and a fifth land 206 for obstructing the hydraulic pressure from being exhausted through an exhaust port Ex. The valve spool V5 is biased by means of an elastic member 208 such that the first port 186 and the second port 188 are obstructed when the hydraulic pressure is exerting no force on the valve spool V5.

The fourth speed band valve 80 for supplying the hydraulic pressure to the fourth friction element 86 and the fifth friction element 90 has a first port 210 which receives the hydraulic pressure via the conduit 82, a second port 212 for supplying the hydraulic pressure from the first port 210 to the fourth friction element 86, a third port 214 which receives the hydraulic pressure via the conduit 88, and a fourth port 216 for supplying the hydraulic pressure from the third port 214 to the fifth friction element 90.

A valve spool V6 of the fourth speed band valve 80 has a first land 218 for opening and closing the first port 210 and the second port 212, a second land 220 for opening and closing the third port 214 from the fourth port 216. The valve spool V6 is biased by means of an elastic member 222 such that the first port 210 and the second port 212 are obstructed when the hydraulic pressure is exerting no force on the valve spool V6.

The solenoid valves S1 and S2 are of normally open types which open the conduits 66 and 74 respectively when no electric power is supplied from the TCU, and the solenoid valve S3 is of a normally closed type which normally keeps the conduit 82 closed.

Accordingly, when the solenoid valves S1 and S2 are in ON states, the hydraulic pressure from the forward pressure conduit 60 are exhausted such that no pressure is supplied through the conduit 66, and when the solenoid valves S1 and S2 are in OFF states, the hydraulic pressure from the forward pressure conduit 60 are supplied through the conduit 66. Also, when the solenoid valve S3 is are in an ON state, the hydraulic pressure from the conduit 82 is supplied to the fourth speed band valve 80, and when the solenoid valve S3 is in an OFF state, the supply of the hydraulic pressure is obstructed.

In the hydraulic control system as described above, the hydraulic pump 32 driven by the engine supplies the pressurized fluid toward the line pressure conduit 48. When shift selector lever is moved to the. "D" range from the "N" range, the hydraulic pressure from the line pressure conduit 48 is supplied to the forward pressure conduit 60 via the manual valve 58.

The hydraulic pressure passing through the forward pressure conduit 60 is varied by the change of the hydraulic pressure in the first pressure detecting chamber 112 according to the proportional control of the solenoid valve S5 which in turn is controlled by the TCU according to the change of torque during driving.

In case the solenoid valve S5 is controlled in accordance with a high duty ratio, the pressure supplied to the first pressure detecting chamber 112 gradually decreases to zero such that the valve spool V1 is displaced leftward under the action of the hydraulic pressure supplied to the second pressure detecting chamber 114. Thus, the hydraulic pressure passing through the line pressure conduit 48 decreases because the hydraulic pressure supplied through the first port 102 is exhausted through the exhaust port 122.

On the contrary, in case the solenoid valve S5 is controlled in accordance with a low duty ratio, the pressure supplied to the first pressure detecting chamber 112 increases to displace the valve spool V1 rightward. Thus the exhaust port 122 is obstructed by the second land 118 and the pressure in the line pressure conduit 48 increases.

The hydraulic pressure regulated as above is passed through the forward pressure conduit 60 at the "D" range, and the solenoid valve S6 which was at an OFF state is controlled in accordance with a high duty ratio at a range for actuating the damper clutch to exhaust the hydraulic pressure in the first pressure detecting chamber 130 to displace the valve spool leftward.

Accordingly the hydraulic pressure from the first port 124 is supplied to the torque converter 30 via the third port 128 to actuate the damper clutch.

The above-mentioned operation is applied to every speed stages which will be described hereinafter to control the hydraulic pressure and repeat the actuating and deactivating operation of the damper clutch.

Following are the description of speed stages with reference to FIG. 1 to 4.

The first speed of the "D" range

Figure 4:
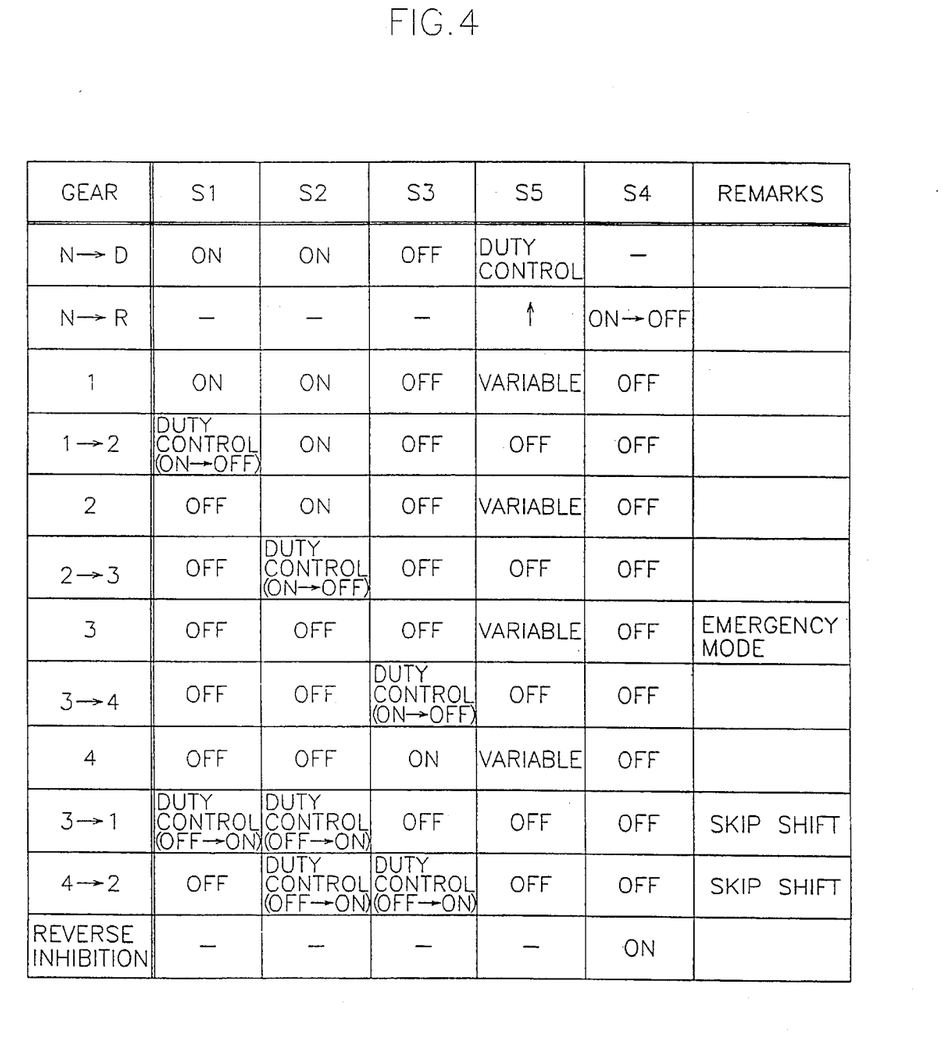
FIG. 4 is a table of solenoid valve operation for the system of the first embodiment.

When the shift selector lever is moved from the "N" range to the "D" range, the TCU controls the solenoid valve S1 and S2 to the ON state, the solenoid valve S3 to the OFF state and the solenoid valve S5 variably to regulate the line pressure so as to increase the power train efficiency.

The hydraulic pressure passing through the forward pressure conduit 60 is supplied to the first friction element 96 via the conduit 94, and a part of the pressurized fluid is supplied toward the conduit 66 to be exhausted because the solenoid valve S1 of a normally open type is controlled to the ON state.

The elastic member 184 maintains the valve spool V4 of the second speed clutch valve 64 displaced leftward such that the second land 176 separates the fourth port 168 from the third port 166.

Thus, the hydraulic pressure supplied to the second speed clutch valve 64 through the forward pressure conduit 60 does not proceed anymore, and therefore, only the first friction element 96 is actuated at the first stage.

The first-second speed shifting of the "D" range

As the vehicle speed gets higher at the first speed, the TCU stops controlling the solenoid valve S5 variably to regulate the line pressure and begins controlling the solenoid valve S1 in accordance with a duty ratio from the ON state to the OFF state.

While the first friction element 96 which have been actuated at the first speed is kept on actuating, the hydraulic pressure passing through the conduit 60 is supplied to the first port 162 of second speed clutch valve 64 via the conduit 66.

The hydraulic pressure supplied through the first port 162 exerts a force on the left side of the first land 174 to push the valve spool V4 rightward. As a result, the third port 166 and the fourth port 168 which were separated by the second land 176 become communicated with each other, and the hydraulic pressure supplied to the third port 166 is passed to the third speed clutch valve 72, and the hydraulic pressure supplied to the first port 162 by pushing the valve spool V4 rightward is passed to the second friction element 68 via the second port 164 and the conduit 70 to actuate the second friction element 68.

A part of the pressurized fluid flowing the conduit 66 is supplied to the third port 152 of the reverse clutch inhibiter 56 in order to the keep the vehicle from being driven reversely.

The second speed of the "D" range

The solenoid valve S1 which were controlled in accordance with a duty/ratio at the first-second speed shifting is controlled to a complete OFF state to maintain the second speed, and the solenoid valve S5 begins to make the line pressure varied.

The second-third Speed:shifting of the "D" range

As the vehicle speed gets higher at the second speed, the TCU stops controlling the solenoid valve S5 variably to regulate the line pressure and begins controlling the solenoid valve S2 in accordance with a duty ratio from the ON state to the OFF state.

While the first friction element 96 and the second friction element 68 which were actuated at the second speed are kept on actuating, because the solenoid valve S2 is controlled to the OFF state in accordance with a duty ratio, the hydraulic pressure passed through the third port 166 and the fourth port 168 of the second speed clutch valve 64 is increased and supplied to the first port 186 of the third speed clutch valve by pushing the valve spool V5.

As a result, the hydraulic pressure which is supplied through the first port 186 passes through the second port 188, supplied to the third friction element 76 and supplied to the third port 214 of the fourth speed band valve 80 along with the conduit branched off from the conduit 78.

Because the solenoid valve S3 is of a normally closed type, the hydraulic pressure supplied through the first port.210 of the fourth speed band valve 80 is obstructed and the valve spool V6 of the fourth speed band valve 80 is biased leftward by the elastic member 222. Accordingly the hydraulic pressure passed through the third port 214 is supplied to the fifth friction element 90 via the fourth port 216 to actuate the fifth friction element 90.

The third speed of the "D" range

The solenoid valve S2 which were controlled in accordance with a duty ratio at the second-third speed shifting is controlled to a complete OFF state to maintain the third speed, and the solenoid valve S5 begins to make the line pressure varied.

The third-fourth speed shifting of the "D" range

As the vehicle speed gets higher at the third speed, the TCU stops controlling the solenoid valve S5 variably to regulate the line pressure and begins controlling the solenoid valve S3 in accordance with a duty ratio from the OFF state to the ON state to supply the hydraulic pressure which was passing the conduit 82 to the first port 210 of the fourth speed band valve 80.

The force exerted by the hydraulic pressure supplied through the first port 210 makes the valve spool V6 displaced rightward to open the second port 212, and the hydraulic pressure passed through the second port 212 is supplied to the fourth friction element 86 via the conduit 84.

As the valve spool V6 is displaced rightward under the action of the hydraulic pressure supplied through the first port 210, the second land 220 obstructs the third port 214, the hydraulic pressure supplied to the fifth friction element 90 is obstructed, and the fourth speed begins.

The fourth speed of the "D" range

The solenoid valve S3 is controlled to a complete ON state by the TCU to maintain the fourth speed, and the solenoid valve S5 begins to control variably.

The shifting from the "N" range to the "R" range

When the shift select lever is moved to the "R" range, the solenoid valve S5 which makes the line pressure varied is controlled in accordance with a duty ratio by the TCU. The line pressure so varied is directly supplied to the reverse friction element 98 via the manual valve 58 and the conduit 62.

A part of the pressurized fluid in the reverse pressure conduit 62 is supplied to the first port 148 of the reverse clutch inhibiter valve 56. Simultaneously, the solenoid valve S4 is controlled from the ON state to the OFF state in accordance with a duty ratio to increase the pressure in the pressure detecting chamber 154 to make the valve spool V3 displaced leftward such that the first port 148 and the second port 150 are communicated with each other.

As a result, the hydraulic pressure passed through the first port 148 is supplied to the sixth friction element 99 through the second port 150 and the conduit 100 to actuate the sixth friction element and perform a reverse control.

The third-first skip shifting at the "D" range

When the vehicle is accelerated abruptly or the opening degree of the throttle valve is increased suddenly by kicking a accelerator pedal down at the third speed, the TCU makes the solenoid valves S1 and S2 controlled sequentially from the OFF state to the ON state in accordance with a duty ratio.

Because the hydraulic pressure supplied to the first port 186 of the third speed clutch valve 72 is interrupted, the valve spool V5 is moved leftward under the action of the spring 208, and the hydraulic pressure supplied to the third friction element 76 through the conduit 78 is interrupted.

Also, because the hydraulic pressure supplied to the first port 162 of the second speed clutch valve 64 is interrupted, the valve spool V4 is moved leftward under the action of the spring 184, and the hydraulic pressure supplied to the second friction element 68 through the conduit 70 is interrupted thus completing the skip shifting to the first speed.

A shift shock may occur during this shifting, which can be reduced by providing a one way clutch to the power train (not shown).

The fourth-second skip shifting at the "D" range

When the vehicle should speed up swiftly at the fourth speed and therefore the opening degree of the throttle valve is increased suddenly by kicking the accelerator pedal down, the TCU makes the solenoid valves S2 and S3 controlled sequentially from the OFF state to the ON state in accordance with a duty ratio, and the third and fourth friction elements 76 and 86 are deactivated to perform the skip shifting to the second speed.

A shift shock may occur during this shifting also, which can be reduced by properly designing the power train.

When the reverse mode is selected in error while driving forward by moving the shift selector lever to the "R" range, the TCU makes solenoid valve S4 of a normally closed type controlled from the OFF state to the ON state to exhaust the hydraulic pressure in the reverse clutch inhibiter valve 56.

Thus the valve spool V3 of the reverse clutch inhibiter valve 56 is shifted rightward under the action of the hydraulic pressure supplied through the third port 152 to close the second port 150 through which the hydraulic pressure is supplied to the reverse friction element 98 at the reverse mode such that the vehicle is not driven in the reverse direction.

Figure 5:
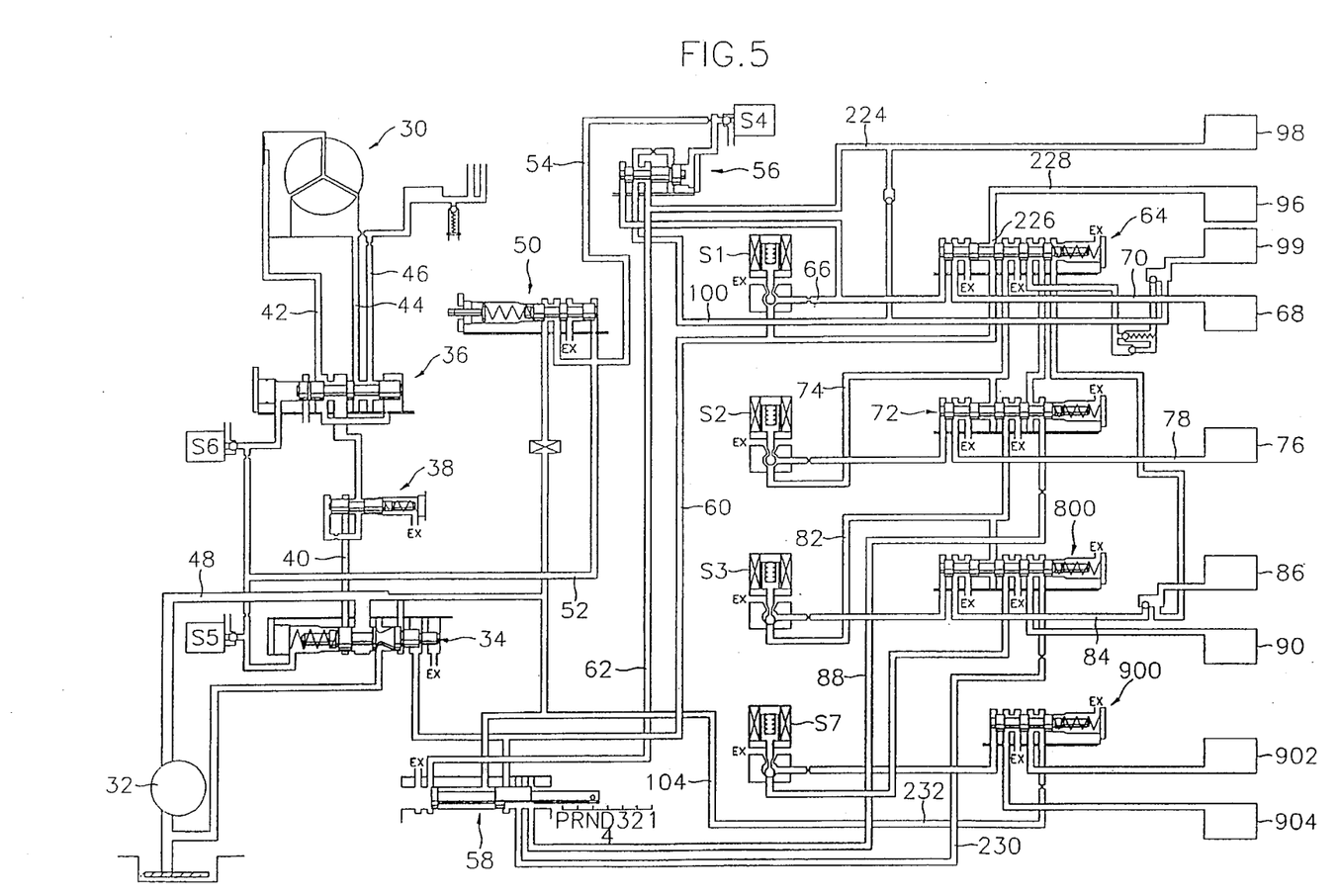
FIG. 5 a schematic view of a hydraulic control system of a five-speed automatic transmission according to a second embodiment of the invention.
Figure 6:
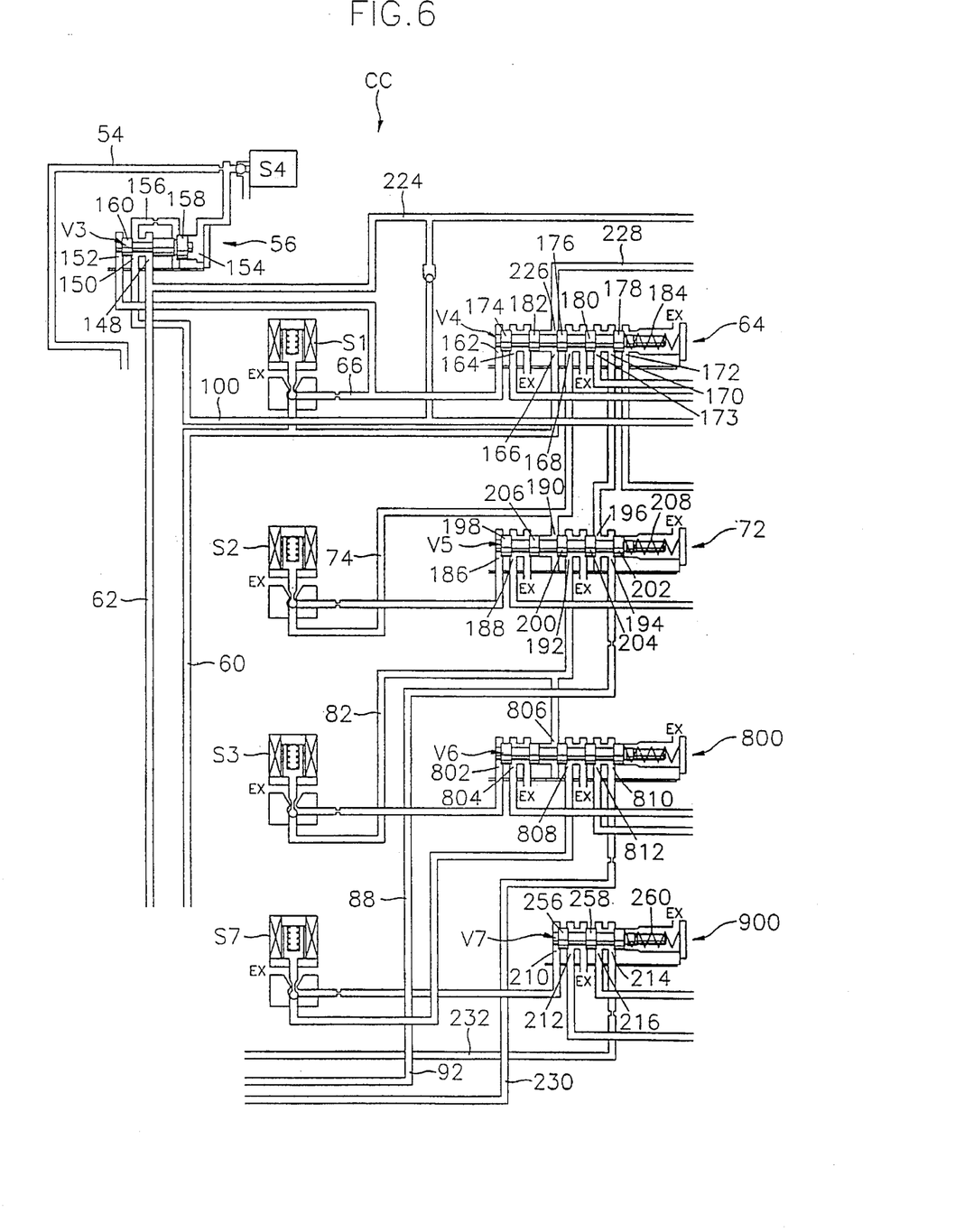
FIG. 6 is an enlarged view of a shift control section in the system shown in FIG. 5.
Figure 7:
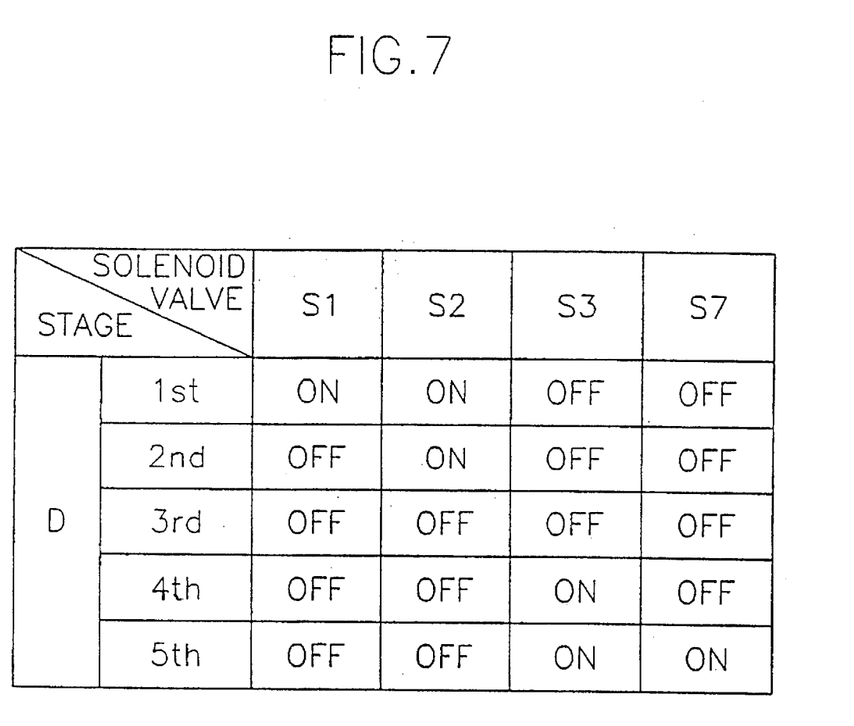
FIG. 7 is a table of solenoid valve operation for the system of the second embodiment.

FIG. 5 to 7 illustrate a second embodiment of the invention applied to a 5-speed automatic transmission.

The power transmission efficiency control section of the hydraulic control system of the second embodiment is same as that of the first embodiment. The shift control section CC of the system of the second embodiment is different from that of the second embodiment in that it has an overdrive unit valve 900 for supplying the hydraulic pressure to a seventh friction element acting at the fifth speed, a solenoid valve S7 for controlling the overdrive unit valve 900, and hydraulic connections to and from them.

With reference to FIG. 5 to 7, following are the description of the second embodiment, mainly with regard to the shift control section CC as shown in FIG. 5.

The reverse clutch inhibiter valve 56 which keeps the vehicle from malfunctioning when the reverse mode is selected in error while driving forward communicates with the reverse friction element 98 via the conduit 224 to supply the hydraulic pressure thereto (FIG. 5).

The reverse clutch inhibiter valve 56, the second speed clutch valve 64, the third speed clutch valve 72 and hydraulic connections between them are same as those in FIG. 3. The second speed clutch valve 64 has an eighth port 226 to which the hydraulic pressure is supplied regardless to the shifting stages at forward ranges via the conduit 228 (FIG. 6).

The third speed clutch valve 72 is same as that of the first embodiment in that the conduit 82 which is connected to the fourth port 192 is connected to the solenoid valve S3 except that the conduit 82 is connected to a fourth speed band valve 800 also.

The fourth speed band valve 800 of the second embodiment has a first port 802 to which the hydraulic pressure is supplied from the solenoid valve S3, a second port 804 for supplying the hydraulic pressure from the first port 802 to the fourth friction element 86 which is actuated at the fourth speed of the "D" range, a third port 806 to which the hydraulic pressure is supplied via the conduit 82, a fourth port 808 for supplying the hydraulic pressure from the third port 806 to an overdrive unit valve 900, a fifth port 810 to which the hydraulic pressure is supplied from the manual valve 58 via the conduit 230 at the "3", "2" and "L" ranges, and the sixth port 812 for supplying the hydraulic pressure to the fifth friction element 90 at the "3", "2" and "L" ranges. The valve spool V6 of the fourth speed band valve 800 is same as that of the second speed and third speed clutch valves 64 and 72.

The solenoid valve S7 selectively interrupts the hydraulic connection between the fourth speed band valve 800 and the overdrive unit valve 900.

A valve spool V7 of the overdrive unit valve 900 is same as that of the fourth speed band valve 80 of the first embodiment except that the third port 214 is directly connected to the manual valve 58 via the conduit 232.

The fourth port 216 of the overdrive unit valve 900 is connected to the seventh friction element 902 which is actuated at the first, second, third and fourth speeds, and the second port 212 of the overdrive unit valve 900 is connected to the eighth friction element 904 which is actuated at the fifth speed only.

The shifting operation between the first to fourth speeds in the hydraulic control system of the second embodiment is same as that of the first embodiment. In addition, the shifting operation between the fourth to fifth speeds can be performed in the hydraulic control system of the second embodiment (FIG. 7).

As the vehicle speed gets higher at the third speed, the solenoid valve S7 which was controlled to the OFF state is controlled to the ON state in accordance with a high duty ratio, and the hydraulic pressure from the fourth speed band valve 800 is supplied to the overdrive unit valve 900.

The hydraulic pressure supplied through first port 210 of the overdrive unit valve 900 acts to push the valve spool V7 rightward and is supplied to the eighth friction element 904 via the second port 212. Thus the third and fourth ports 214 and 216 of the overdrive unit valve 900 is closed and the supply of the hydraulic pressure from the manual valve 58 to the seventh friction element 902 is stopped.

The fifth speed shifting control is completed as the solenoid valve S7 is controlled to the ON state in accordance with a high duty ratio while the shifting operation between the fourth to fifth speeds is performed.

A fifth-second skip shifting is possible in the hydraulic control system of the second embodiment, unlike in that of the first embodiment.

When the vehicle should speed up swiftly at the fifth speed of the "D" range and therefore the opening degree of the throttle valve is increased suddenly by kicking the accelerator pedal down, the TCU controls the solenoid valves S3 and S7 which are in an ON state of high duty ratio to an OFF state to deactivate the fifth and eighth friction elements 86 and 904 and activate the seventh friction element 902. Also the TCU controls the solenoid valve S2 in an ON state from a low duty ratio to a high duty ratio, and the third friction element 76 is deactivated to perform the skip shifting to the second speed. The shift shock occurred during this shifting can be reduced by providing the one way clutch to the power train.

Also, the fifth-third skip shifting at the "D" range is possible. When the vehicle should speed up swiftly at the fifth speed of the "D" range and therefore the opening degree of the throttle valve is increased in accordance with the kick down amount of the accelerator pedal like in the fifth-second skip shifting, the TCU controls the solenoid valves S3 and S7 from a high duty ratio to a low duty ratio to deactivate the fourth and eighth friction elements 86 and 904 and activate the seventh friction element 902 to perform the fifth-third skip shifting. The shift shock occurred during this shifting can be reduced by providing the one way clutch to the power train.

As described and illustrated, the hydraulic control system according to the present invention is simple in construction and shows a quick response because the friction elements are controlled independent of each other. Also, the number of the valves in the shift control section is minimized, and the means for keeping the vehicle from malfunctioning when the reverse mode is selected in error while driving forward is provided. Further, the power transmission efficiency is improved by controlling the line pressure variably, the shock caused by gear shifting is reduced by means of the control of the solenoid valves, and skip shifting are possible when the vehicle is sped up abruptly.

What is claimed is:

1. A hydraulic control system of an automatic transmission for an automotive vehicle, comprising:

a hydraulic pump, driven by an engine, for pressurizing fluid;

a pressure regulating valve for varying a hydraulic pressure when shifting to a forward mode or a reverse mode;

a torque converter for transmitting a power of the engine to an input shaft of the transmission;

a converter clutch regulator valve for actuating a damper clutch to improve a transmission efficiency of said torque converter;

first, second and third solenoid valves controlled by a transmission control unit for supplying the hydraulic pressure or obstructing a supply of the hydraulic pressure which is varied in said pressure regulating valve to shift valves of a transmission control section to displace valve spools of said shift valves;

a first to a eighth friction elements commonly actuated at each speed stage;

second speed and third speed clutch valves, a fourth speed band valve and an overdrive unit valve controlled by ON/OFF functions according to duty ratios of said solenoid valves for selectively supplying the hydraulic pressure to said friction elements to perform shifting; and a manual valve operated by a shift select lever, for supplying the hydraulic pressure to a reverse pressure conduit or to a forward pressure conduit.

2. The hydraulic control system as claimed in claim 1, wherein said second speed clutch valve is controlled according to the duty ratio of said first solenoid valve and open/close states of at least two ports of said second speed clutch valve are changed thereby to make said second friction element actuated by an action of the hydraulic pressure of said forward pressure conduit and to supply the hydraulic pressure to said third speed clutch valve for a next speed stage.

3. The hydraulic control system as claimed in claim 1, wherein said third speed clutch valve is controlled according to the duty ratio of said second solenoid valve and open/close states of at least two ports of said third speed clutch valve are changed thereby to make said third friction element actuated and to supply the hydraulic pressure to said fourth speed band valve for a next speed stage.

4. The hydraulic control system as claimed in claim 1, wherein said fourth speed band valve is controlled according to the duty ratio of said third solenoid valve to make said fourth friction element actuated and to supply the hydraulic pressure to an overdrive unit valve for a next speed stage.

5. The hydraulic control system as claimed in claim 1, wherein said second solenoid valve is controlled according to a low duty ratio in a second speed to open a hydraulic passage to said third friction element and said third and fourth solenoid valves are controlled according to high duty ratios to open hydraulic passages to said fourth and first friction elements respectively to perform a skip shifting to a fifth speed.

6. The hydraulic control system as claimed in claim 1, wherein a first port of said second speed clutch valve is connected to a third port which can be used to displace a valve spool of a reverse clutch inhibiter valve whose ports are opened or closed according to an ON/OFF operation of said fifth solenoid valve.

* * * * *